United States Patent [19]
Schmidt-Hansen et al.

[11] Patent Number: 6,073,977
[45] Date of Patent: *Jun. 13, 2000

[54] DEVICE FOR COUPLING PIPE SECTIONS

[75] Inventors: Hans Schmidt-Hansen; Werner J. Andresen, both of Haderslev, Denmark

[73] Assignee: Lindab AB, Bastad, Sweden

[ * ] Notice: This patent issued on a continued prosecution application filed under 37 CFR 1.53(d), and is subject to the twenty year patent term provisions of 35 U.S.C. 154(a)(2).

[21] Appl. No.: 08/793,787

[22] PCT Filed: Sep. 7, 1995

[86] PCT No.: PCT/SE95/01001

§ 371 Date: Mar. 5, 1997

§ 102(e) Date: Mar. 5, 1997

[87] PCT Pub. No.: WO96/07848

PCT Pub. Date: Mar. 14, 1996

[30] Foreign Application Priority Data

Sep. 8, 1994 [DK] Denmark ............................ 9400346 U
Nov. 8, 1994 [SE] Sweden .................................. 9403815

[51] Int. Cl.[7] ............................... F16L 17/00; F16L 23/00
[52] U.S. Cl. ............................ 285/373; 24/279; 285/233; 285/410
[58] Field of Search ............................ 28/373, 233, 410; 24/279

[56] References Cited

U.S. PATENT DOCUMENTS

| | | | |
|---|---|---|---|
| 2,339,759 | 1/1944 | Bidwell | 24/279 |
| 2,341,828 | 2/1944 | Tetzlaff | 24/279 |
| 2,395,745 | 2/1946 | King | 24/279 |
| 2,403,449 | 7/1946 | Meyer et al. | 24/279 |
| 2,426,423 | 8/1947 | Woolsey | 285/129 |

(List continued on next page.)

FOREIGN PATENT DOCUMENTS

| | | |
|---|---|---|
| 05081989 | 6/1992 | Denmark . |
| 94 00346 U3 | 10/1994 | Denmark . |
| 0057373 | 8/1982 | European Pat. Off. . |
| 287755A1 | 10/1988 | European Pat. Off. . |
| 0470201 | 11/1990 | European Pat. Off. . |
| 1475620 | 6/1965 | Germany . |
| 2517808 | 4/1975 | Germany . |
| 604275 | 5/1960 | Italy . |
| 8326971A | 12/1996 | Japan . |
| 466415 | 2/1992 | Sweden . |
| 549183 | 11/1942 | United Kingdom ............... 285/233 |
| 790109 | 2/1958 | United Kingdom ............... 285/373 |
| 1100183 | 1/1968 | United Kingdom . |
| WO 94/12295 | 6/1994 | WIPO . |
| WO967848 | 3/1996 | WIPO . |
| WO9722828 | 6/1997 | WIPO . |

OTHER PUBLICATIONS

"Ventilation 96", *Lindab*, from 1996, p. 6/42.
"*Platslageri*" (in English: Plate Works), No. 11/96, advertisement.
R3., Pioneer in METU duct Manufacture System, *Circular Duct Flanges LF & SR.*

*Primary Examiner*—Eric K. Nicholson
*Attorney, Agent, or Firm*—Weingarten, Schurgin, Gagnebin & Hayes LLP

[57] ABSTRACT

A device for coupling two pipe sections comprises a clamping band of U-shaped cross-section with two inwardly directed flanges for encompassing end beads of the pipe sections which are to be coupled. The ends of the clamping band have cylindrical pockets each accommodating a cylindrical element which is rotatable about its own axis in the pocket. The clamping band is clamped by means of a threaded screw which is passed through an unthreaded hole in one cylindrical element and unthreaded holes in the ends of the clamping band, whereupon the screw is in threaded engagement with the other cylindrical element.

4 Claims, 2 Drawing Sheets

6,073,977

Page 2

U.S. PATENT DOCUMENTS

| | | | |
|---|---|---|---|
| 2,677,164 | 5/1954 | Stade | 24/279 |
| 2,699,343 | 1/1955 | Troeger et al. | 285/129 |
| 2,941,822 | 6/1960 | Good . | |
| 3,006,663 | 10/1961 | Bowne . | |
| 3,084,959 | 4/1963 | Stanton | 285/233 |
| 3,235,293 | 2/1966 | Condon | 285/233 |
| 3,334,928 | 8/1967 | Schmunk | 285/110 |
| 3,464,722 | 9/1969 | Larkin | 285/367 |
| 3,479,066 | 11/1969 | Gittleman | 285/236 |
| 3,517,701 | 6/1970 | Smith | 138/97 |
| 3,633,947 | 1/1972 | Nelson | 285/233 |
| 3,788,677 | 1/1974 | Stade et al. . | |
| 4,135,741 | 1/1979 | Albertsen | 285/55 |
| 4,215,883 | 8/1980 | Brown | 285/236 |
| 4,365,393 | 12/1982 | Hauffe et al. | 24/279 |
| 4,417,755 | 11/1983 | Gittleman | 285/373 |
| 4,629,226 | 12/1986 | Cassel et al. | 285/382 |
| 4,813,720 | 3/1989 | Cassel | 285/419 |
| 4,822,083 | 4/1989 | Meinig . | |
| 5,137,305 | 8/1992 | Straub | 285/112 |
| 5,170,540 | 12/1992 | Oetiker | 24/279 |
| 5,505,503 | 4/1996 | Boivin | 285/364 |

DEVICE FOR COUPLING PIPE SECTIONS

CROSS-REFERENCE TO RELATED APPLICATIONS

Priority is claimed to PCT application No. PCT/SE95/01001 filed Sep. 7, 1995, based on Swedish patent application No. 9403815-5 filed Nov. 8, 1994 and Denmark utility model application No. 94-00346 UM, filed Sep. 8, 1994.

STATEMENT REGARDING FEDERALLY SPONSORED RESEARCH OR DEVELOPMENT

Not Applicable.

BACKGROUND OF THE INVENTION

The present invention relates generally to a device for coupling pipe sections whose one end has an outwardly directed bead or a plurality of projections positioned along the circumference. The invention is particularly directed to a device with a clamping band of the type which preferably is used for the coupling of pipes of thin metal sheet, of which the front ends have flanges or outwardly directed beads, such as spiral-fold ventilating pipes and grain conveying pipes, or for the clamping of, for instance, end covers on electric motors or the like. Pipe sections, to which the invention is applicable, are shown in, for instance, Danish Design Registration MR 0508/89.

Prior-art clamping bands of this type are usually fitted with a clamping device, which can consist of, for instance, a handle with a wire or leaf spring (snap lock), the handle and the spring being directly integrated with the clamping band by bending or like operation, or attached by means of mountings which are mounted on the band by riveting or welding.

There are also prior-art clamping bands whose ends are bent perpendicularly away from the band and formed with through holes, the band being clamped by a screw being passed through the outwardly bent ends and a preferably square nut being put on the screw, whereupon the screw and the nut are clamped, thereby moving the ends of the clamping band together.

These prior-art devices are, however, provided with rather complicated clamping mechanisms. Usually, the abutment means cooperating with the straining screw are specially designed and positioned in specially constructed spaces or pockets which are defined by flanges of the clamping band. For instance, the pockets may be formed by the two end portions of the clamping band being rearwardly bent and riveted, soldered or welded to the outer circumference of the clamping band. This makes the construction of the clamping device expensive.

Therefore, the object of the invention is to provide a simple and inexpensive coupling device which eliminates the drawbacks inherent in prior-art clamping bands. Moreover, the invention aims at providing a coupling device having a good sealing effect.

BRIEF SUMMARY OF THE INVENTION

According to the invention, these and other objects, which will appear from the description below, are now achieved by means of a device for coupling first and second pipe sections each having an outwardly directed bead at a respective end thereof, said device comprising: an annular clamping band with two opposite, spaced-apart ends, at which a clamping mechanism is arranged for tightening the band around the end beads of the pipe sections; the clamping band being of substantially U-shaped cross-section with two flanges for safely encompassing the end beads; each end of the clamping band forming a pocket with circular-cylindrical cross-section; said clamping mechanism comprising first and second cylinder elements which are each arranged in a separate pocket and have a circular-cylindrical cross-section, the greatest cross-sectional dimension of said cylinder elements being slightly smaller than the smallest internal cross-sectional dimension of said pocket; and a straining screw for connecting said cylinder elements; the first cylinder element having a transverse threaded hole, whereas the second cylinder element has a transverse unthreaded hole; said straining screw extending freely through the unthreaded hole, through unthreaded holes in the opposite ends of the clamping band and finally being in threaded engagement with the threaded hole; characterized in that the first and second cylinder elements are arranged freely rotatable about their own axis inside the respective pocket; and that the clamping band on its inside facing the end beads of the pipe sections has a circumferential seal for abutment against the end beads.

Owing to the cylindrically designed pockets at the ends of the clamping band and the cylindrical elements arranged therein, the clamping band is subjected mainly to tangential forces while being drawn together, since the two cylindrical elements have the possibility of turning as the band is drawn together to a smaller diameter. In prior-art clamping bands of the type in which flanges are bent perpendicularly away from the bands, these flanges are, however, subjected to heavy stress during drawing together, since they are not perpendicular to the direction of drawing together.

The inventive clamping band has the additional advantage that it is easy to manufacture, since no riveting, soldering, welding or other fastening of the clamping parts is required, and that the used cylindrical elements and the screw can be of standard type and are available on the market.

The pockets, which are preferably formed in a simple bending operation, can be of, for instance, circular-cylindrical or square cross-section, and the corresponding cylindrical elements can be of square and circular-cylindrical cross-section, respectively.

The device according to the invention has the advantage in respect of manufacturing technique that the two cylindrical elements can be readily inserted sideways into the respective pockets in the ends of the clamping band. The clamping band is preferably supplied with the cylindrical elements positioned in the pockets and the straining screw inserted through and in engagement with the holes in the cylindrical elements.

According to a preferred embodiment, both the pockets and the cylindrical elements are of circular-cylindrical cross-section. This results in the cylindrical elements having a larger engagement surface in the pocket such that the clamping force is distributed over a greater part of the inside of the pocket.

For preventing leakage in the joint between the pipe sections, the clamping band is, according to a preferred embodiment, fitted with an internal circumferential seal which preferably is made of rubber and which has two cross-sectionally cup-shaped portions for engaging the two beads of the pipe sections.

BRIEF DESCRIPTION OF THE DRAWING

The invention will now be described in more detail below with reference to the accompanying drawing which illustrates various embodiments and in which.

DETAILED DESCRIPTION OF THE INVENTION

Figure 1:
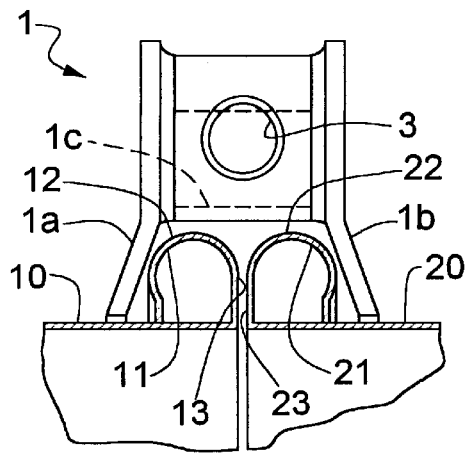
FIG. 1 shows a pipe coupling with a clamping band according to the invention seen in the direction of arrows I—I in FIG. 3.

FIG. 1 shows a coupling device according to the invention, comprising a clamping band 1 being of U-shaped cross-section and having two flanges 1a, 1b joined by a bead bridging member which here encompass two schematically illustrated pipe sections 10, 20 with circumferential end beads 11 and 21, respectively, which are formed by bending. The end beads 11 and 21 each include radially outwardly directed surfaces 12 and 22 and surfaces 13 and 23 that oppose each other and lie in a plane orthogonal to the axis of the pipe sections when the pipe sections are coupled in end-to-end relationship. The flanges 1a, 1b diverge slightly in order to facilitate the mounting of the clamping band 1 on the beads 11, 21.

Figure 2:
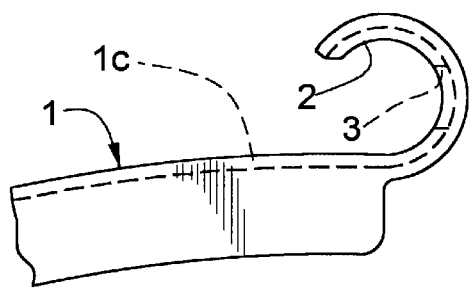
FIG. 2 is a side view of an end of the clamping band in FIG. 1.
Figure 3:
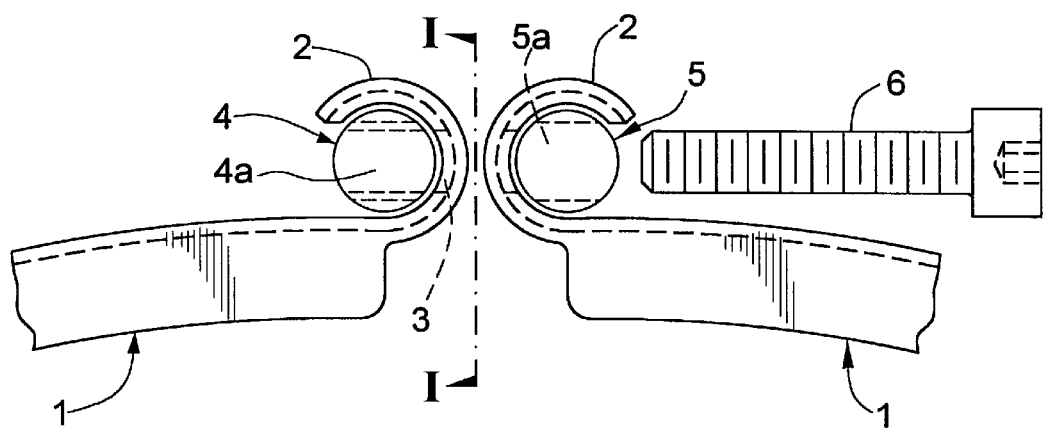
FIG. 3 is a side view of part of the clamping band, whose ends are prepared to be clamped, the pipes in the pipe coupling, however, being excluded for the sake of clearness.

The clamping band 1 shown in FIGS. 1–3 has end portions 2 which are bent to partially circular shape, form pockets and are each provided with an unthreaded hole 3 whose axis is substantially parallel to the tangent line of the clamping band 1 in the position concerned.

As best seen in FIG. 3, there is in one end portion 2 arranged a nut-shaped abutment in the form of a short cylindrical element 4 having a transverse threaded hole 4a. In the other end portion there is arranged a further element, which is also in the shape of a short cylindrical element 5 but which has a transverse unthreaded hole 5a for a tightening screw 6.

The components and parts 2–6 thus form a simple, but efficient clamping mechanism for displacing the end portions 2 of the clamping band 1 relative to each other, whereby the band 1 can be tightened and the desired clamping around the beads 11, 21 can be achieved.

Figure 3A:
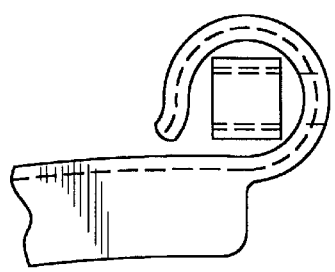
FIGS. 3a and 3b illustrate two alternative embodiments of pockets and cylindrical elements.
Figure 3B:
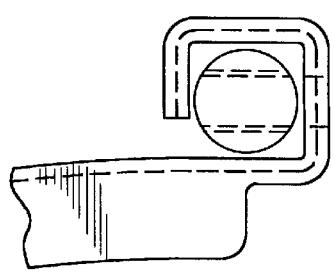
Figure 4:
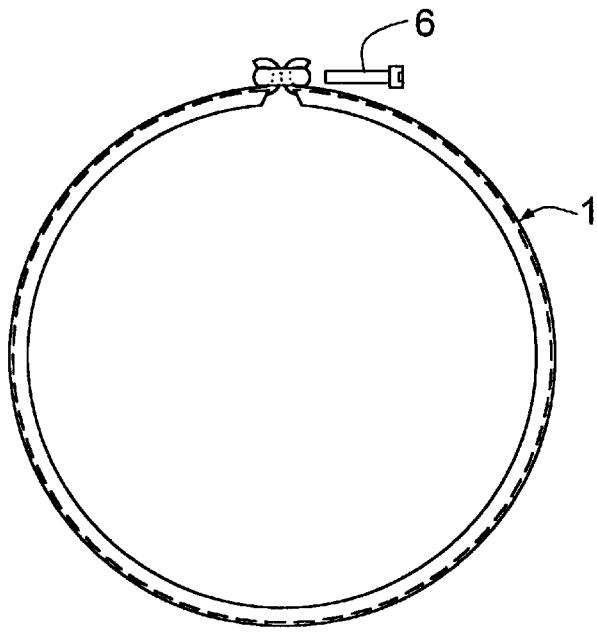
FIG. 4 is a side view, on a smaller scale, of the entire coupling device.

As shown in FIGS. 3a and 3b, as variants, a cylindrical element of square cross-section can be arranged in a circular-cylindrical pocket, or a circular-cylindrical element can be arranged in a pocket of square cross-section. To accommodate the tightening screw 6, the end portions of the clamping band 1 are in this case fork-shaped at the free ends.

Figure 5:
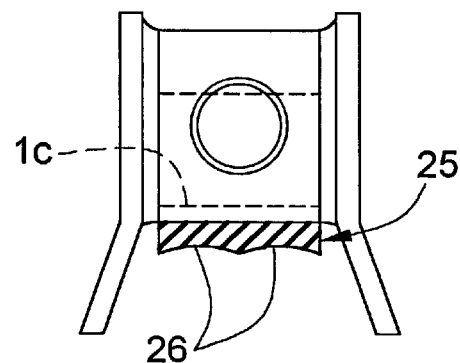
FIG. 5 is a view, corresponding to FIG. 1, of an embodiment with an internal seal on the clamping band.
Figure 6:
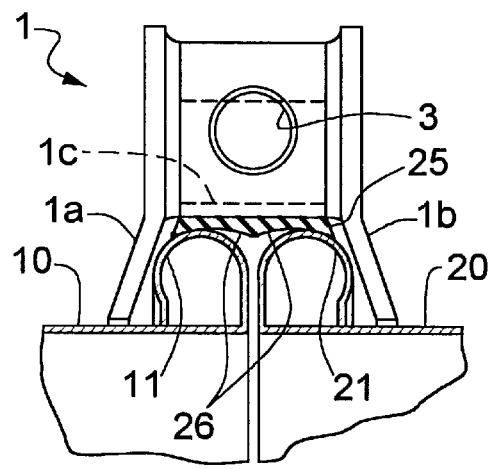
FIG. 6 shows the pipe coupling and clamping band of FIG. 1 with the internal seal of FIG. 5.

According to a preferred embodiment, the clamping band 1 has an internal circumferential seal 25, as shown in FIGS. 5 and 6, consisting of a polymer, preferably rubber. The surface of the seal 25 facing the beads 11, 21 (FIGS. 1 and 6) has two cup-shaped portions 26 for providing reliable abutment against the radially outwardly directed surfaces 12, 22 of the beads 11, 21. It will be appreciated that the seal may have other cross-sectional shapes as long as a satisfactory sealing function is achieved.

What is claimed is:

1. A pipe coupling assembly comprising:

first and second pipe sections of ventilating pipes and grain conveying pipes formed from metal sheet, each pipe section having an outwardly directed end bead at a respective end thereof, each end bead having a radially outwardly directed surface and a surface flush with the respective pipe section end and lying in a plane orthogonal to the axis of the pipe sections and opposing the other end bead when the first and second pipe sections are coupled in an end-to-end relationship;

a coupling device comprising:

an annular clamping band with two opposite, spaced-apart ends, at which a clamping mechanism is arranged for tightening the band around the end beads of the pipe sections, the clamping band being of substantially U-shaped cross-section and comprising:

an annular bead bridging member having a radially inwardly facing inside surface extending linearly across the radially outwardly directed surfaces of the end beads when arranged in the end-to-end relationship, and two flanges extending inwardly from opposite edges of the bead bridging member, the bead bridging member and the two flanges arranged for securely encompassing the end beads;

each respective end of the clamping band having respective first and second pockets each with at least partial circular-cylindrical cross-section and having a hole through an adjacent portion of the clamping band end;

said clamping mechanism comprising:

first and second cylindrical elements which are each arranged in said first and second pockets respectively and each having a circular-cylindrical cross-section, a cross-sectional dimension of said first and second cylindrical elements at their greatest being slightly smaller than an internal cross-sectional dimension of said first and second pockets at their smallest, and a tightening screw for connecting said cylindrical elements, the first cylindrical element having a transverse hole threaded for said tightening screw, the second cylindrical element having a transverse hole permitting free movement of said tightening screw;

said tightening screw extending freely through the hole of said second cylindrical element, through the holes in the ends of the clamping band and being in threaded engagement with the threaded hole of said first cylindrical element;

each of said first and second cylindrical elements being freely rotatable inside the respective first and second pockets about a cylindrical axis thereof; and a circumferential seal disposed on the inside surface of the bead bridging member of the clamping band to abut against said radially outwardly directed surfaces of the end beads to exert a radially inwardly directed pressure on the radially outwardly directed surfaces of the end beads to form a sealing surface thereagainst, the seal configured to overlie the end beads and having a configuration complementary to the radially outwardly directed surfaces of the end beads, the seal further configured to fill a space between the radially outwardly directed surfaces of the end beads and the inside surface of the bead bridging member without extending into a space between the opposed surfaces of the end beads when coupled in the end-to-end relationship.

2. The assembly as claimed in claim 1, wherein a surface of said seal facing the end beads has two cup-shaped portions for abutment against the respective end beads.

3. The assembly as claimed in claim 1, wherein the seal consists of an elastic polymer.

4. The assembly of claim 3 wherein said polymer is rubber.

* * * * *

UNITED STATES PATENT AND TRADEMARK OFFICE
CERTIFICATE OF CORRECTION

PATENT NO.    : 6,073,977  
DATED         : June 13, 2000  
INVENTOR(S)   : Hans Schmidt-Hansen et al.

Page 1 of 1

It is certified that error appears in the above-identified patent and that said Letters Patent is hereby corrected as shown below:

<u>Column 3,</u>  
Line 23, "member which" should read -- member 1c which --.

Signed and Sealed this

Twenty-sixth Day of February, 2002

Attest:

JAMES E. ROGAN  
*Attesting Officer*   *Director of the United States Patent and Trademark Office*